United States Patent [19]

Pickering

[11] 3,964,081

[45] June 15, 1976

[54] ANTI-BOUNCE SHUTTER

[75] Inventor: Charles E. Pickering, Rochester, N.Y.

[73] Assignee: Eastman Kodak Company, Rochester, N.Y.

[22] Filed: Mar. 19, 1975

[21] Appl. No.: 559,940

[52] U.S. Cl. .................................. 354/246; 354/252

[51] Int. Cl.² .................................. G03B 9/40

[58] Field of Search ............. 354/246, 247, 245, 48, 354/50, 51, 252, 226

[56] References Cited

UNITED STATES PATENTS

| | | | |
|---|---|---|---|
| 2,953,076 | 9/1960 | Leuschke et al. | 354/265 |
| 3,018,686 | 1/1962 | Kurz | 354/246 X |
| 3,228,315 | 1/1966 | Platt | 354/246 |
| 3,283,687 | 11/1966 | Singer et al. | 354/252 |
| 3,715,959 | 2/1973 | Harvey | 354/246 |
| 3,833,915 | 9/1974 | Tanaka et al. | 354/246 X |
| 3,847,476 | 11/1974 | Onda et al. | 354/252 |
| 3,852,786 | 12/1974 | Onda et al. | 354/252 |
| T922,009 | 5/1974 | Aleppi | 354/51 X |

FOREIGN PATENTS OR APPLICATIONS

| | | | |
|---|---|---|---|
| 969,275 | 5/1950 | France | 354/246 |

*Primary Examiner*—Joseph F. Peters, Jr.
*Attorney, Agent, or Firm*—John L. Palmer

[57] ABSTRACT

A camera shutter in which opening and closing shutter blades are sequentially movable between terminal light unblocking and blocking positions of an exposure aperture respectively. Each blade defines a notch located to be movable relative to a pin positioned within the path of movement of the notch to engage the notch and arrest the motion of the blade at its respective terminal position.

3 Claims, 7 Drawing Figures

ANTI-BOUNCE SHUTTER

BACKGROUND OF THE INVENTION

1. Field of the Invention

The present invention relates generally to camera shutters and more particularly to a camera shutter assembly that prevents rebound of the shutter blades at the terminal position of motion during the taking of an exposure.

2. Description Of The Prior Art

Shutter blades that are movable to open and close a shutter aperture to effect an exposure, move at high speeds and it is necessary to completely stop the motion of the blades at a preselected position in order to obtain an accurate exposure. If the motion of the shutter blades is not properly arrested, the blades will continue past their intended stop position or rebound back from their stop position to again partially open the shutter aperture whereupon re-exposure of the film occurs.

One technique that has been used to prevent occurrence of such phenomena is to provide a narrow groove in which the shutter blades enter upon completion of their movement. The narrow groove engages with the shutter blades and by a wedging action stops them at the intended stop position. Another technique that has been used is to position a fixed abutment member in the path of travel of the shutter blades in conjunction with a rebound prevention pawl that engages the shutter blades as they abut the abutment member, thus preventing rebound movement. These techniques are disadvantageous since considerable space is needed to house the apparatus, thus making it difficult to reduce the size of the shutter assembly to that currently desired in smaller-sized compact cameras.

SUMMARY OF THE INVENTION

It is therefore an object of the present invention to provide a shutter assembly for a camera that is free of rebound of the shutter blades after completion of their respective opening and closing movement.

These and other objects are attained in one embodiment of the invention in which a camera shutter comprises a first shutter blade, having a notch therein and being movable from a light blocking position and light unblocking position, a second shutter blade, having a notch therein and being movable from a light unblocking position to a light blocking position, and a pin disposed in the path of movement of the first and second blade and being located to engage the notches upon arrival of the blades at the light unblocking position and blocking positions respectively to arrest the motion thereof.

BRIEF DESCRIPTION OF THE DRAWINGS

The invention and its advantages will become more apparent in the Brief Description of the Preferred Embodiment considered in conjunction with the accompanying drawings in which.

DETAILED DESCRIPTION OF THE DRAWINGS

Because photographic cameras are well known, the present description will be directed in particular to elements forming part of or cooperating more directly with, the present invention, camera elements not specifically shown or described herein being understood to be selectable from those known in the art.

Figure 1:
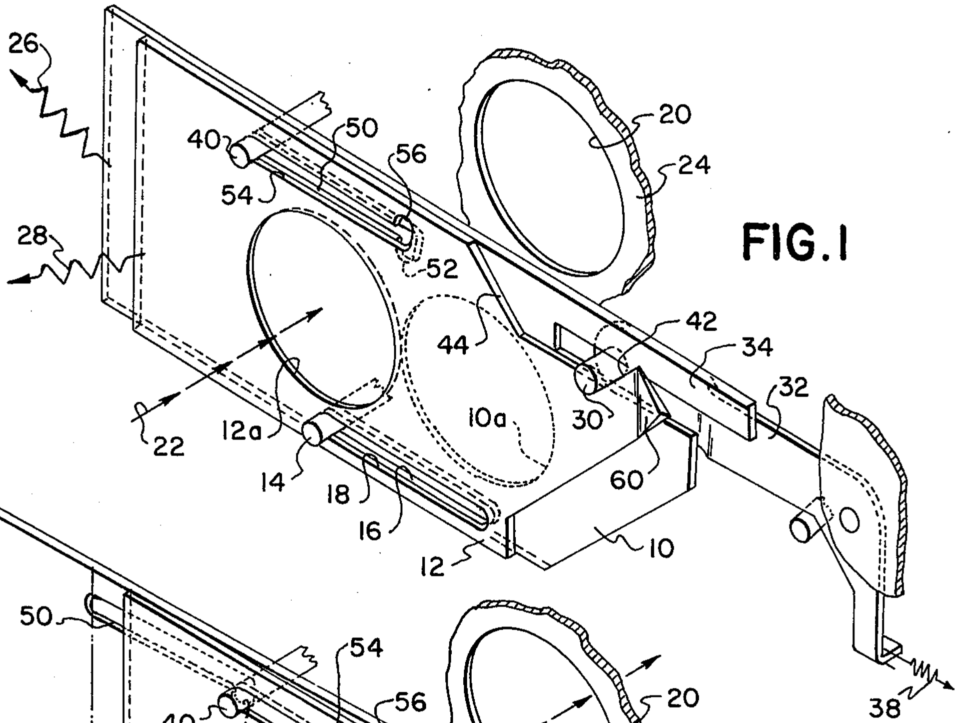
FIG. 1 is an elevational view of a shutter of the present invention shown in the cocked position.

Referring first to FIG. 1 there is shown a shutter of the type having an opening shutter blade 10 and a closing shutter blade 12, each of which is slidably mounted on a pin 14 received in slots 16, 18 of the blades 10, 12 respectively, and juxtaposed for sequential movement to effect exposure. An exposure aperture 20 is aligned with a lens axis 22 formed in a shutter housing, a part of which is shown at 24. The blades 10, 12 form apertures 10*a* and 12*a* respectively that cooperate with the exposure aperture 20 to permit exposure therethrough. In FIG. 1, the blade 12 is shown positioned in its initial, light unblocking position wherein the aperture 12*a* is aligned with the exposure aperture 20, but an opaque portion of the opening blade 10, also shown in its initial, light-blocking position overlies the coincident apertures 12*a*, 20. The blades 10, 12 are biased by springs 26, 28 respectively to be moved from the initial positions of FIG. 1, to terminal positions as shown in FIGS. 2 and 3 respectively.

The blade 10 is held in its initial position, against biasing tension of the spring 26, by a release mechanism, not shown, but which may be any of the types well known in the prior art. The blade 12 is retained in the initial position, against the biasing tension of the spring 28, by a pin 30 carried by a lever 32 which in turn is held by a tail 34 of the blade 10. The lever 32 is pivotally mounted to a support 36 for movement between active and inactive positions, being urged to its active position by a light spring 38, as shown by FIG. 1. In the active position of the lever 32, the pin 30 is brought into engagement with a cam surface 42 formed in a cutaway portion 44 of the blade 12, and is captured between the tail 34 and the cam surface 42. In the inactive position of the lever 32 (FIG. 3), the pin 30 becomes disengaged from the tail 34 and the cam surface 42.

Figure 5:
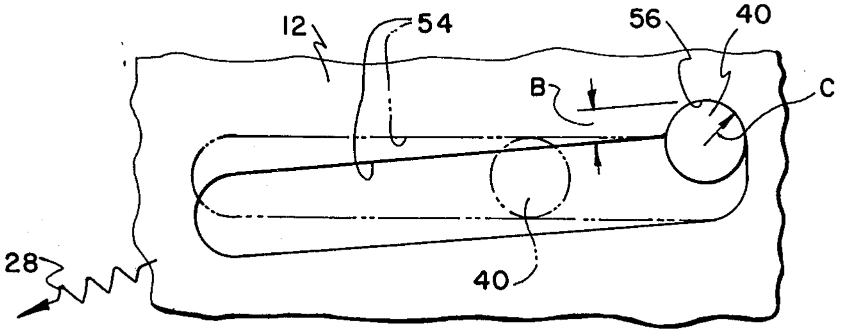
FIG. 5 is an enlarged view of a portion of the closing blade in the arrested position showing an arresting member in accordance with the present invention.

In accordance with the invention, the blade 10 contains an elongated slot 50 having a notch 52 formed in its trailing end; the blade 12 also contains a similar elongated slot 54 and a notch 56. The slots 50, 54 lie in overlapping positions, and the notches 52, 56 lie adjacent to each other, extending in opposite directions within the slots 50, 54. A pin 40 is received in the slots 50, 54, and is positioned to engage the notches 52, 56 upon arrival of the blades 10, 12 at their terminal positions. The slots 50, 54 are slightly arcuate at the slotted end. The arcuate portion of the slots 50, 54, impacts the pin 40 as the blades 10, 12 reach the terminal positions of motion. Such impact normally results in some rebound of the shutter blades 10, 12 toward their light blocking or unblocking positions respectively. However, the spring 28 is located on the blade 12 to force the blade 12 laterally and, as shown in FIG. 5, to impart a slight counterclockwise rotational force to the blade 12 (to create a moment about the pin 40 as the blade 12 moves). The spring 26 similarly moves the blade 10 but the rotational force is clockwise. This rotational force is in the direction of the notches 52 or 56 respectively and is sufficient to force the notches 52, 56 into engagement with the pin 40 upon impact of the arcuate portions of the slots 50, 54 with the pin 40.

Figure 2:
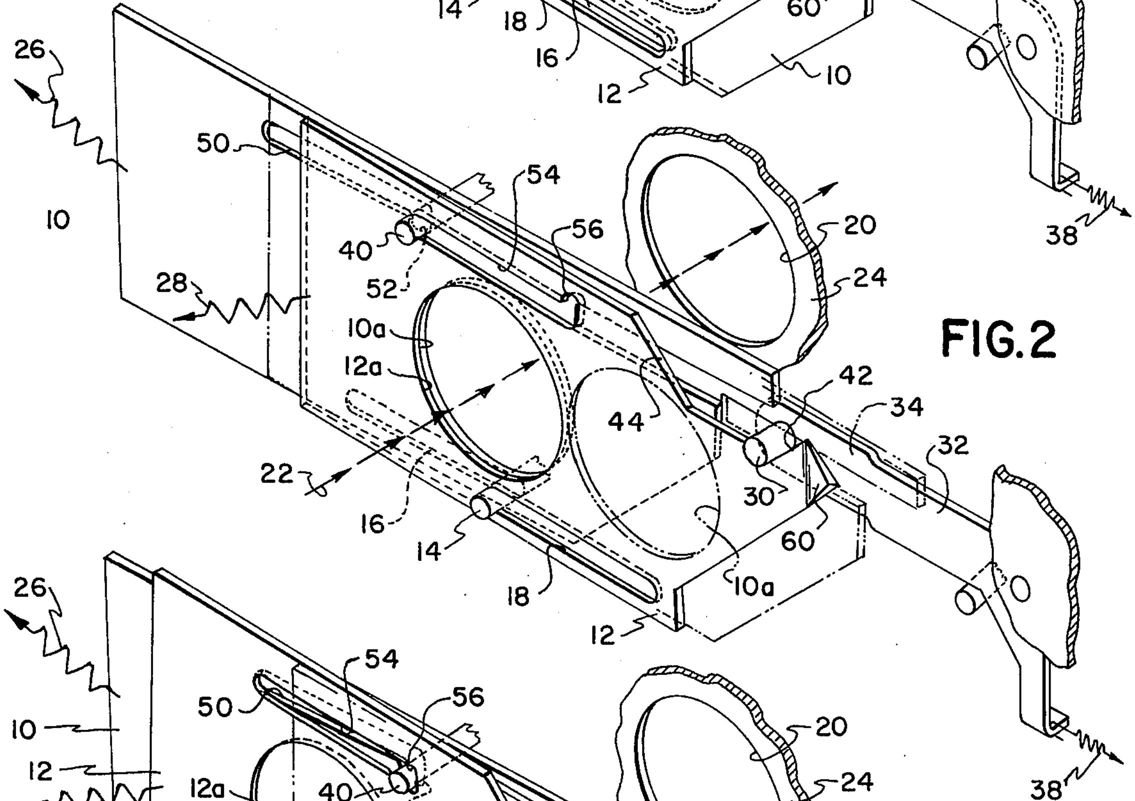
FIG. 2 is an elevational view of the shutter of FIG. 1 wherein the opening blade has moved to its light unblocking position, in which the motion of opening blade has been arrested in accordance with the present invention.
Figure 3:
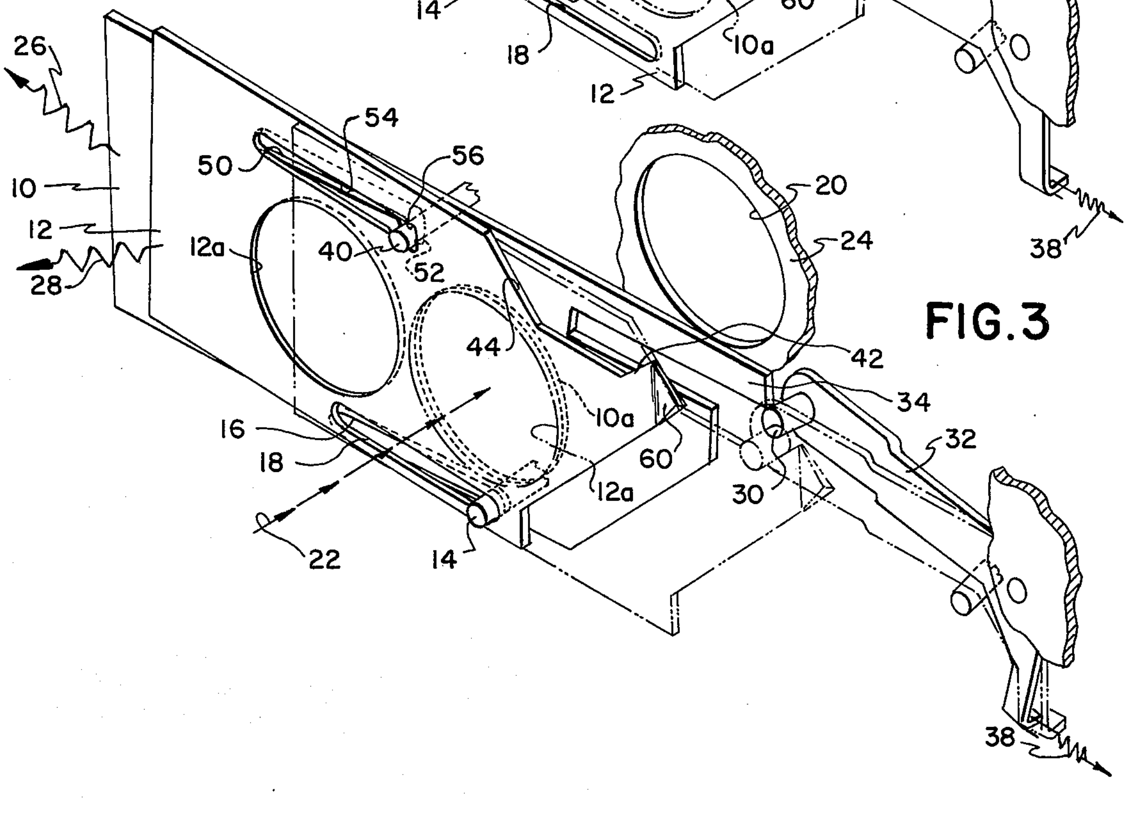
FIG. 3 is an elevational view of the shutter of FIG. 1 after the closing shutter blade has moved to its light blocking position, wherein the motion of the closing blade has been arrested in accordance with the present invention.

In operation, actuation of a shutter release (not shown) releases the blade 10 for movement in the direction of arrow A to its terminal, light unblocking position as shown in FIG. 2. This movement is lateral with the slight moment in the direction of the notch 52 created about the pin 40, and continues until the aperture 10*a* is aligned with the aperture 12*a* so as to effect exposure in aperture 20. Due to the slight moment about the pin 40, upon reaching the aperture unblocking position, the arcuate portion of the slot 50 strikes the pin 40, the notch 52 is urged to an engaging position with the pin 40; forward or reverse motion blade 10 is thus prevented. Coincident with partial alignment of the apertures 10*a* and 12*a* as illustrated in FIG. 2, tail 34 disengages from the pin 30. The pin 30 is now permitted to move along the cam surface 42 as the blade spring 28 moves the closing blade 12 in the direction of arrow A. Thus the force of movement of the blade 12 cams the lever 32 to its inactive position, shown by the dotted line of FIG. 3, and the pin 30 clears the cam surface 12; thereupon the blade 12 rapidly moves to its light blocking position to terminate the exposure by displacing the aperture 12*a* to a position shown in FIG. 3. The spring 28, similar to spring 26, exerts the slight rotational force to the closing blade 12 in a counterclockwise direction, (in the direction of the indentation of the notch 56); thus upon reaching the light blocking position, the arcuate portion of the slot 54 strikes the pin 40 and the notch 56 engages the pin 40; forward or reverse motion of the blade 12 is thus prevented. Opening blade 10 and closing blade 12 have been arrested at their terminal positions to effect exposure, without rebound.

Figure 4A:
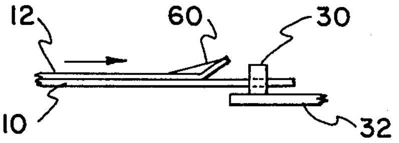
FIG. 4 is a partial plan view showing the cocking of the apparatus of the present invention.
Figure 4B:
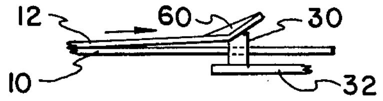
Figure 4C:
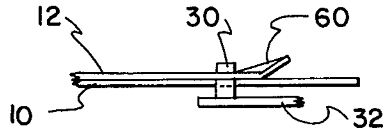

As shown in FIG. 5, the notch 56 (similarly notch 52, not shown) is of depth B that is slightly less than the radius C of the pin 40. The slight difference permits the notches 52, 56 to ride over the pin 40 as the blades 10, 12 are cocked, yet does not significantly effect the arresting action of the pin-notch arrangement. Also, as shown in FIG. 4, during cocking, the apparatus relies upon the flexibility of the blade 12 and an upturned, oblique projection 60 located thereon. As shown in FIGS. 1 through 3, the cam surface 42 is located at the end of the blade 12, and the projection 60, beyond the cam surface 42, is bent obliquely to the plane of the blade 12 and away from blade 10. When the apparatus is being cocked as shown in FIGS. 4*a–c* i.e., the blades 10, 12 are being moved to the right, the lever 32 occupies the position shown in FIG. 1 and the pin 30 is positioned in the path of the movement of the oblique projection 60. As can be seen in FIGS. 4*a*, 4*b*, and 4*c*, the projection 60 engages the pin 30 during this movement and forces the end of the blade 12 to bend very slightly (see FIG. 4*b*). As the blade 12 continues to move, the projection 60 slides up and over the pin 32 until the cam surface 42 passes the pin 30. The projection 60 snaps back to its usual position closely adjacent blade 12 as shown in FIG. 4*c*. During cocking movement of the closing blade 12, pin 30 enters the space between the tail 34 of the opening blade 10 and cutaway portion 44 of the blade 12 so that blade 10 engages the pin 30 and retains the lever 32 in the position shown in FIG. 1, thereby preventing its pivotal movement.

The invention has been described in detail with particular reference to preferred embodiments thereof, but it will be understood that variations and modifications can be effected within the spirit and scope of the invention.

I claim:

1. In a camera, shutter apparatus, comprising:

a first shutter blade having a notch therein and being movable from an initial, light blocking position to a terminal, light unblocking position;

a second shutter blade having a notch therein and being movable from an initial, light unblocking position to a terminal, light blocking position;

means for moving said first and second shutter blades from said initial to said terminal positions; and a pin disposed in the path of movement of the first and second blade and being located to engage the notches upon arrival of the blades at the light unblocking position and blocking positions respectively to arrest the motion thereof.

2. A shutter as recited in claim 1 in which said notches extend in opposite direction on said blades respectively.

3. A shutter as recited in claim 2 in which said moving means exerts a respective moment to said blades in the direction of said notch.

* * * * *